June 5, 1956  W. G. SMITH  2,748,441
QUICK ACTION CLAMP DEVICE
Filed Aug. 15, 1952
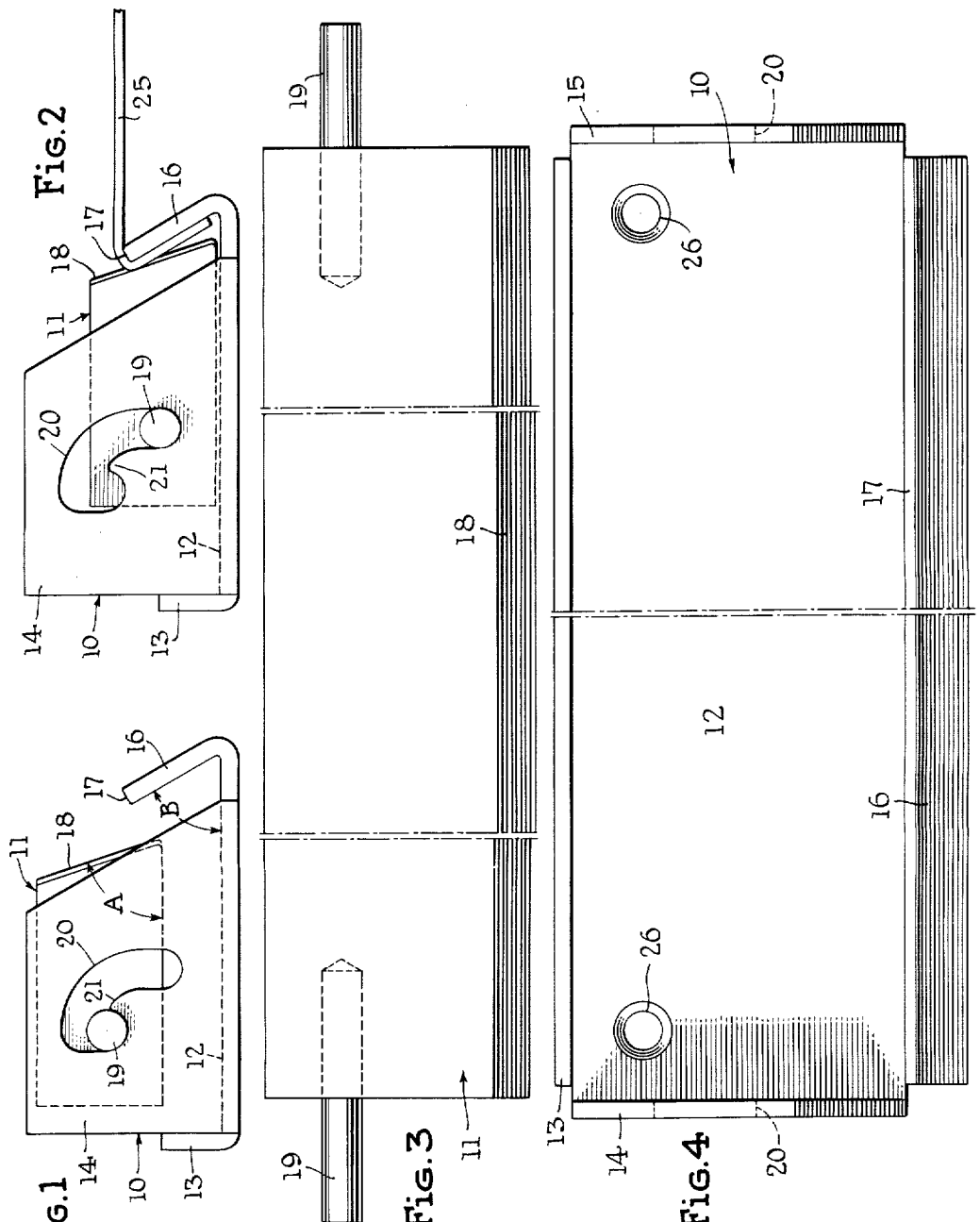
INVENTOR
William G. Smith
BY  *Oscar L. Spencer*
ATTORNEY.

United States Patent Office 2,748,441
Patented June 5, 1956

2,748,441

QUICK ACTION CLAMP DEVICE

William G. Smith, Tarentum, Pa., assignor to Pittsburgh Plate Glass Company, Allegheny County, Pa., a corporation of Pennsylvania Application August 15, 1952, Serial No. 304,465

3 Claims. (Cl. 24—263)

This invention relates to clamps and more particularly to an improved quick-action clamp or gripping device for holding vinyl sheet material while stretching and shaping said material.

In an application for Letters Patent, Serial No. 304,594, filed August 15, 1952, by Brook J. Dennison and William G. Smith, novel apparatus and methods for preforming plastic interlayers for laminated curved windshields are disclosed. The present invention provides a novel clamp or gripping device construction particularly suitable for use in the apparatus and methods disclosed in said application. In the formation of plastic interlayers for laminated windshields in which the interlayer is provided with a band of color to serve as an integral sun visor, it has been found advantageous to stretch the plastic interlayer longitudinally and to cause the interlayer to sag vertically while stretched. In order to properly stretch vinyl sheet material, edges of the material should be held in quick-action clamping devices which firmly grip the material with even pressure and without slippage or cutting. It is also desirable that the clamping devices do not mar the vinyl sheet, and that the devices be quickly applicable to and removable from the side marginal portions of such a sheet.

One object of this invention is the provision of a quick action clamp construction adapted to securely grip the marginal portion of a sheet of plastic material.

Another object of this invention is the provision of a quick action clamp of relatively great length for engaging and holding the side margins of plastic interlayers for laminated windshields during stretching and shaping operations.

A still further object of this invention is the provision of a clamp of simple construction and positive in action.

Other objects and advantages of the invention will become apparent from the following detailed description of preferred embodiments thereof.

In the drawings, Figure 1 is an end elevation view of a clamp embodying the principles of my invention, the clamp being in the open position.

Figure 2 is an end elevation view of the clamp of Figure 1, but being in the closed position engaging the marginal portion of a plastic interlayer sheet.

Figure 3 is a top plan view, somewhat enlarged and cut away, of the bar portion of the clamp.

Figure 4 is a top plan view, somewhat enlarged and cut away, of the frame portion of the clamp.

Referring to the drawings, the clamp comprises two relatively movable members, a frame element designated by the numeral 10, and a bar element designated by the numeral 11. The frame member 10 is formed from sheet metal and comprises a flat base 12 having a bent up rear flange 13, bent up end flanges 14 and 15, and a bent up front lip or flange 16. The end flanges 14 and 15 are substantially parallel to one another and at right angles to the edge 17 of lip 16. The bar element 11 is also formed of metal and is provided with a sloping forward face 18 and is provided with studs 19 projecting from the ends of the bar. The forward face 18 of the bar 11 is preferably slightly curved or bowed outward. For a bar 11 about twenty-six inches in length, the center of the forward face 18 is preferably about one-thirty second inch forward of the ends of face 18, the surface of the face 18 being a smooth curve from one end to the other. The supporting pins or studs 19 of the bar 11 are positioned in slots 20 of the end flanges 14 and 15 of frame member 10. The slots 20 are drilled and cut to the shape illustrated in Figures 1 and 2, a shape which is similar to an inverted letter J, and providing a shoulder 21 for holding the stud 19 and bar 11 raised and spaced from the frame lip 16 when the clamp is not holding plastic sheet material. The angle A between the base or bottom of bar 11 and the forward face 18 of the bar is preferably about seventy degrees. The angle B between the base 12 of frame 10 and the plane of the front lip 16 of frame 10 is preferably about sixty degrees. The horizontal distance from the lower portion of slot 20 to the lip 16 is such that when bar 11 is moved to the clamp position shown in Figure 2, the inclined front face 18 of the bar will cooperate with the lip 16 to securely grip the marginal portion of a vinyl sheet 25. The base 12 of frame element 10 may be provided with suitable apertures 26 to permit it to be bolted or screwed to any desired support, or to a clamping arm of the type shown in the above-mentioned copending application.

The front surface 18 of bar 11 and the inner face and lip end of lip 16 are preferably covered with a layer of polyethylene pressure sensitive tape in order to protect the vinyl sheet 25 from being stretched or otherwise damaged.

In operation, the bar element 11 is positioned as shown in Figure 1 and the marginal portion of the sheet 25 to be clamped is then inserted behind the lip 16. The bar 11 is then moved toward the lip 16, and the studs 19 are moved downward and forward in the slots 20 to urge the bar 11 against the sheet to be clamped. The clamping action is enhanced by reason of the slightly curved face 18 on the clamping bar 11. The slightly convex clamping surface 18 of the bar 11, shown in Figure 3, in combination with the resilience of the elongated sheet metal lip or flange 16 compensates for any tendency of the elongated holding flange to bow outward at its center when a plastic sheet 25 is held in tension. The difference in the angles of the flange 16 and the surface 18 provides for a substantially straight line clamping grip on the plastic sheet material 25, and thereby provides an even clamping and holding action and eliminates looseness or slack in any portion of the width of the sheet 25. The resilience of the elongated sheet metal flange 16 permits the bar to be moved upward from the clamping position shown in Figure 2 to the unclamping position shown in Figure 1. The clamp enables rapid application of substantially uniform pressure over the entire width of the plastic or other sheet material secured therein, and provides for rapid and complete release of such clamping pressure when desired. The shape of the slots 20 provides for a rapid self-locking action, and yet permits the clamp to be unclamped easily and quickly by lifting the ends of the projecting studs 19.

It will be apparent to those skilled in the art that various minor modifications and variations in the nature and arrangement of the several elements of the construction described are possible without departing from the spirit of this invention or the scope of the appended claims.

What I claim is:

1. A quick action clamp device for holding sheet material, said clamp comprising in combination, an elongated frame element having a base and having a longitudinal sheet metal flange projecting upward from and at an acute angle to said base and having an upwardly projecting flange at each end of the base, a bar element positioned between said end flanges of said base and having a bottom surface, and having a longitudinal surface opposing the longitudinal flange, said longitudinal surface of said bar element being at an acute angle to the adjoining bottom surface larger than the acute angle of the longitudinal flange to the base of the frame element, and a stud projecting from each end of said bar, said end flanges of said base having arcuate slots therein and each slot having an end section closest to the longitudinal flange and extending downwardly substantially normal to said base, said slot extending upwardly from said substantially normal end section and outwardly away from the longitudinal flange, and then downwardly and away from the longitudinal flange to receive said studs and position said bar in said frame element, at least the portion of the bottom surface of the bar element adjacent the longitudinal surface of the bar element being parallel to the base of the frame element with the bar element in the clamped position, the studs being in the end sections of the slots closest to the longitudinal flange of the frame element with the bar element in the clamped position, and the longitudinal surface of the bar element extending beyond the end of the longitudinal flange of the frame element with the bar element in the clamped position.

2. A quick action clamp device for holding sheet material, said clamp comprising in combination, an elongated frame element having a base, a straight longitudinal sheet metal flange projecting upwardly therefrom and at an acute angle to the base, and upwardly extending end flanges provided with arcuate slots each having an end section closest to the longitudinal flange and extending downwardly substantially normal to said base, said slot extending upwardly from said substantially normal end section and outwardly away from the longitudinal flange and then downwardly and away from the longitudinal flange, and a bar element having a stud at each end in said slots to be movably supported by and on said frame element, said bar element having a bottom surface and having a longitudinal surface opposing the longitudinal flange adapted to engage and grip sheet material inserted between the longitudinal flange and the longitudinal surface, said longitudinal surface being slightly curved and convex longitudinally toward said straight longitudinal flange and being at an acute angle to the bottom surface of the bar element larger than the acute angle of the longitudinal flange to the base of the frame element, the bottom surface of the bar element being parallel to the base of the frame element with the bar element in the clamped position, the studs being in the end sections of the slots closest to the longitudinal flange of the frame element with the bar element in the clamped position, and the longitudinal surface of the bar element extending beyond the end of the longitudinal flange of the frame element with the bar element in the clamped position.

3. A quick action clamp device for holding sheet plastic material during shaping, said clamp comprising in combination, an elongated sheet metal frame element having a flat base, a turned up edge flange making an angle of substantially sixty degres with the plane of said base, and an upwardly projecting flange at each end of the base, a metal bar element having a flat base and having a longitudinal surface opposing the edge flange, said longitudinal surface of the bar element making an angle of substantially seventy degrees with the plane of the base of the bar element, each of the end flanges of the frame element having an inverted J-shaped slot, the longer arm of each J-shaped slot being closest to the edge flange, said bar element having a stud at each end in said slots, the base of the bar element being parallel to the base of the frame element with the bar element in the clamped position, the studs being in the longer arms of the slots with the bar element in the clamped position, and the longitudinal surface of the bar element extending beyond the end of the longitudinal flange with the bar element in the clamped position.

References Cited in the file of this patent

UNITED STATES PATENTS

| | | |
|---|---|---|
| 389,217 | Glenn | Sept. 11, 1888 |
| 536,780 | Dalpe | Apr. 2, 1895 |
| 923,276 | King | June 1, 1909 |
| 1,950,084 | Halsey | Mar. 6, 1934 |
| 2,163,859 | Ver Bockel | June 27, 1939 |
| 2,609,578 | Andary | Sept. 9, 1952 |
| 2,606,667 | Hornick | Aug. 12, 1952 |

FOREIGN PATENTS

| | | |
|---|---|---|
| 354,455 | Germany | June 9, 1922 |

Dedication 2,748,441.—*William G. Smith*, Tarentum, Pa. QUICK ACTION CLAMP DEVICE. Patent dated June 5, 1956. Dedication filed July 25, 1973, by the assignee, *PPG Industries, Inc.*

Hereby dedicates the remainder of its term to the free use and benefit of the People of the United States.

[*Official Gazette December 25, 1973.*]